(12) United States Patent
Haug et al.

(10) Patent No.: US 8,973,872 B2
(45) Date of Patent: Mar. 10, 2015

(54) FUEL LINE IN AN AIRCRAFT

(75) Inventors: Manfred Haug, Taufkirchen (DE);
Hartmut Kresalek, Faistenhaar (DE)

(73) Assignee: EADS Deutschland GmbH, Ottobrunn (DE)

( * ) Notice: Subject to any disclaimer, the term of this patent is extended or adjusted under 35 U.S.C. 154(b) by 511 days.

(21) Appl. No.: 13/286,736

(22) Filed: Nov. 1, 2011

(65) Prior Publication Data

US 2012/0104172 A1 May 3, 2012

(30) Foreign Application Priority Data

Nov. 2, 2010 (DE) .......................... 10 2010 050 000

(51) Int. Cl.
*B64D 37/00* (2006.01)
*B64D 37/32* (2006.01)
*F16L 9/18* (2006.01)
*F16L 41/02* (2006.01)
*B29D 23/00* (2006.01)
*F16L 39/00* (2006.01)

(52) U.S. Cl.
CPC .............. *B64D 37/32* (2013.01); *B64D 37/005* (2013.01); *F16L 9/18* (2013.01); *F16L 41/021* (2013.01); *B29D 23/008* (2013.01); *F16L 39/005* (2013.01)
USPC ................................................... 244/135 R

(58) Field of Classification Search
CPC ................................... F16L 9/18; F16L 39/005
USPC ................................................... 244/135 R
See application file for complete search history.

(56) References Cited

U.S. PATENT DOCUMENTS

| 1,807,796 | A | * | 6/1931 | Reid | 138/117 |
| 4,157,194 | A | | 6/1979 | Takahashi | |
| 4,633,913 | A | * | 1/1987 | Carty et al. | 138/147 |
| 4,732,414 | A | | 3/1988 | Inaba | |
| 4,786,088 | A | | 11/1988 | Ziu | |
| 4,886,305 | A | | 12/1989 | Martin | |
| 4,930,544 | A | * | 6/1990 | Ziu | 138/113 |
| 5,022,685 | A | * | 6/1991 | Stiskin et al. | 285/45 |
| 5,186,502 | A | | 2/1993 | Martin | |
| 5,845,809 | A | * | 12/1998 | Garrett et al. | 220/728 |
| 6,901,967 | B1 | | 6/2005 | Kuenzer | |
| 7,458,543 | B2 | * | 12/2008 | Cutler et al. | 244/135 A |
| 2002/0093195 | A1 | * | 7/2002 | Poehler | 285/123.1 |

FOREIGN PATENT DOCUMENTS

| DE | 132 448 | 9/1978 |
| DE | 690 04 195 T2 | 5/1994 |
| EP | 1 217 286 A2 | 6/2002 |

\* cited by examiner

*Primary Examiner* — Isam Alsomiri
*Assistant Examiner* — Justin Benedik
(74) *Attorney, Agent, or Firm* — Crowell & Moring LLP

(57) ABSTRACT

A line segment of a fuel line in an aircraft for connecting at least three lines is provided. In order to provide fuel channeling in an aircraft, having, for example, better damage or leakage features, a line segment is provided that has a wall structure forming a continuous cavity. The wall structure has at least three adapter openings for connecting the continuous cavity with respectively one line. The wall structure is designed double walled between the adapter openings in such a way that an intermediate cavity is formed, which encases the continuous cavity.

10 Claims, 15 Drawing Sheets

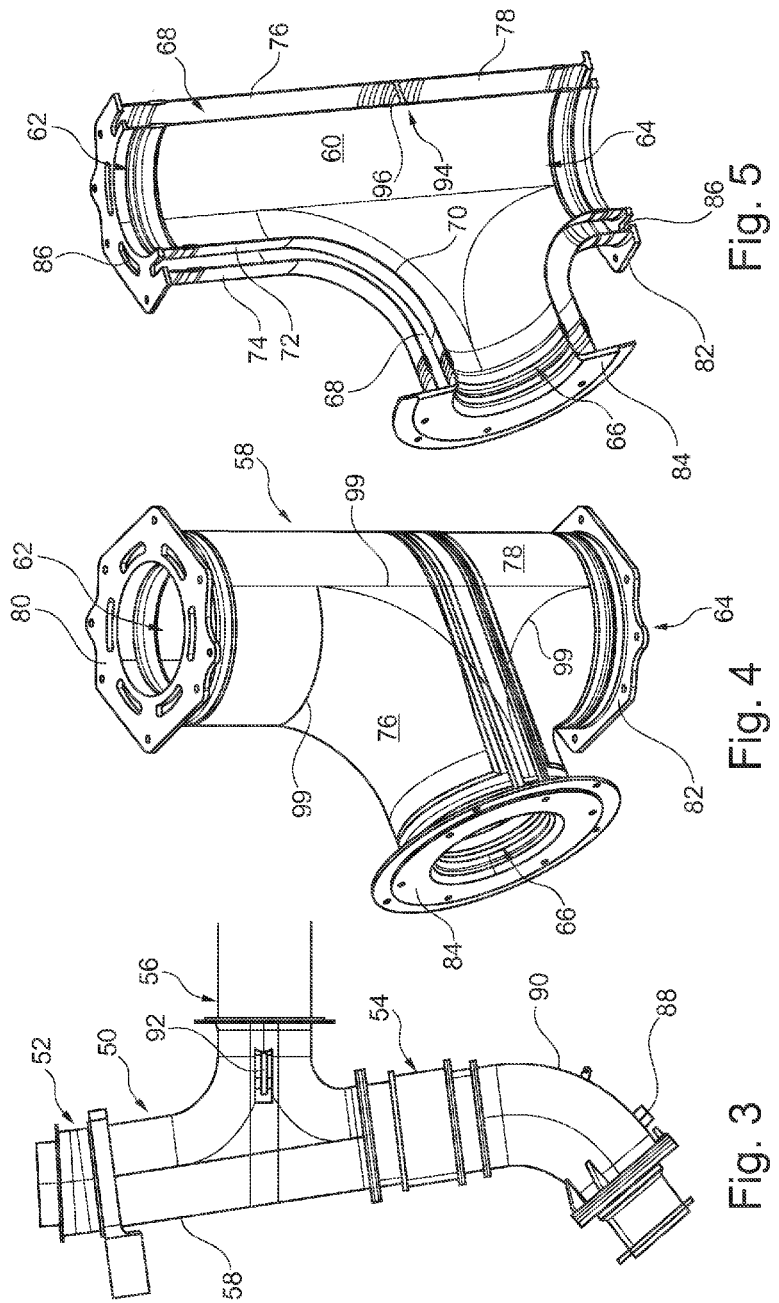

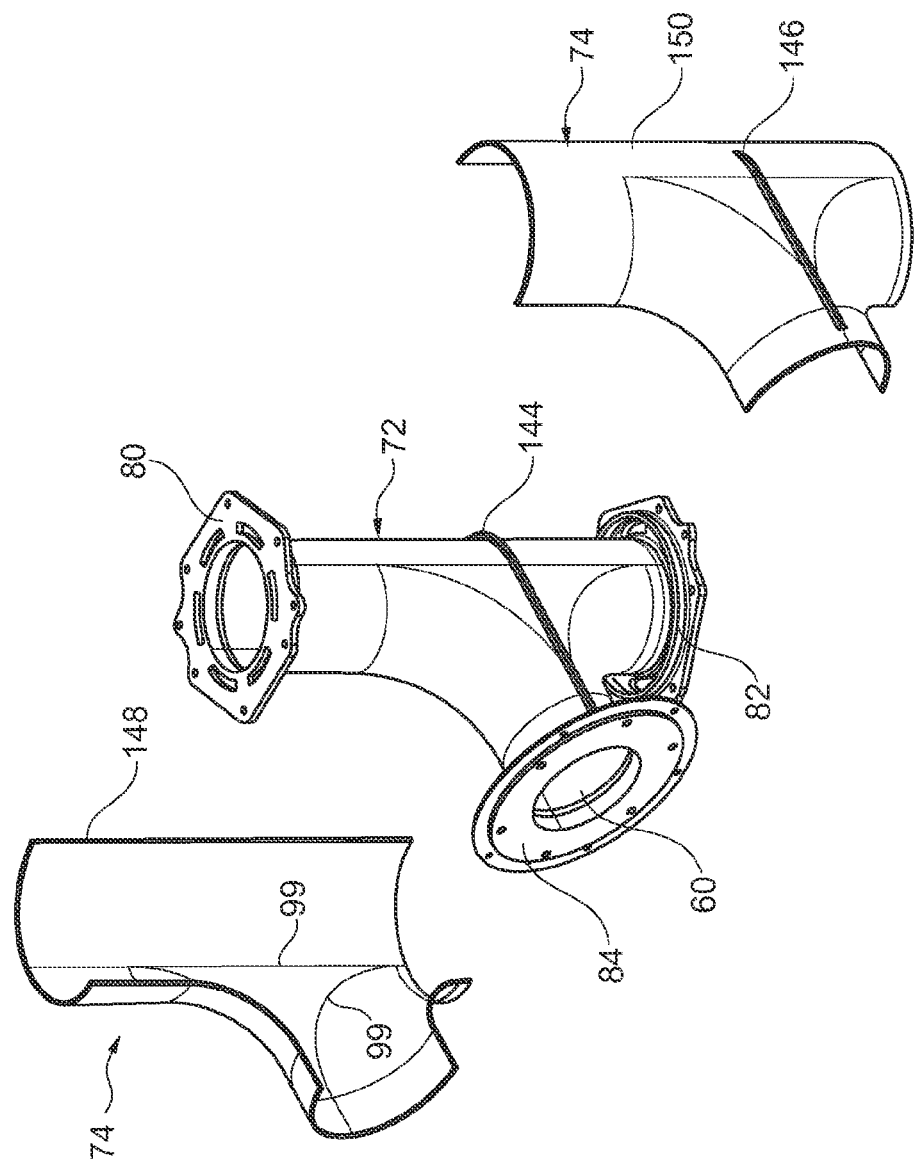

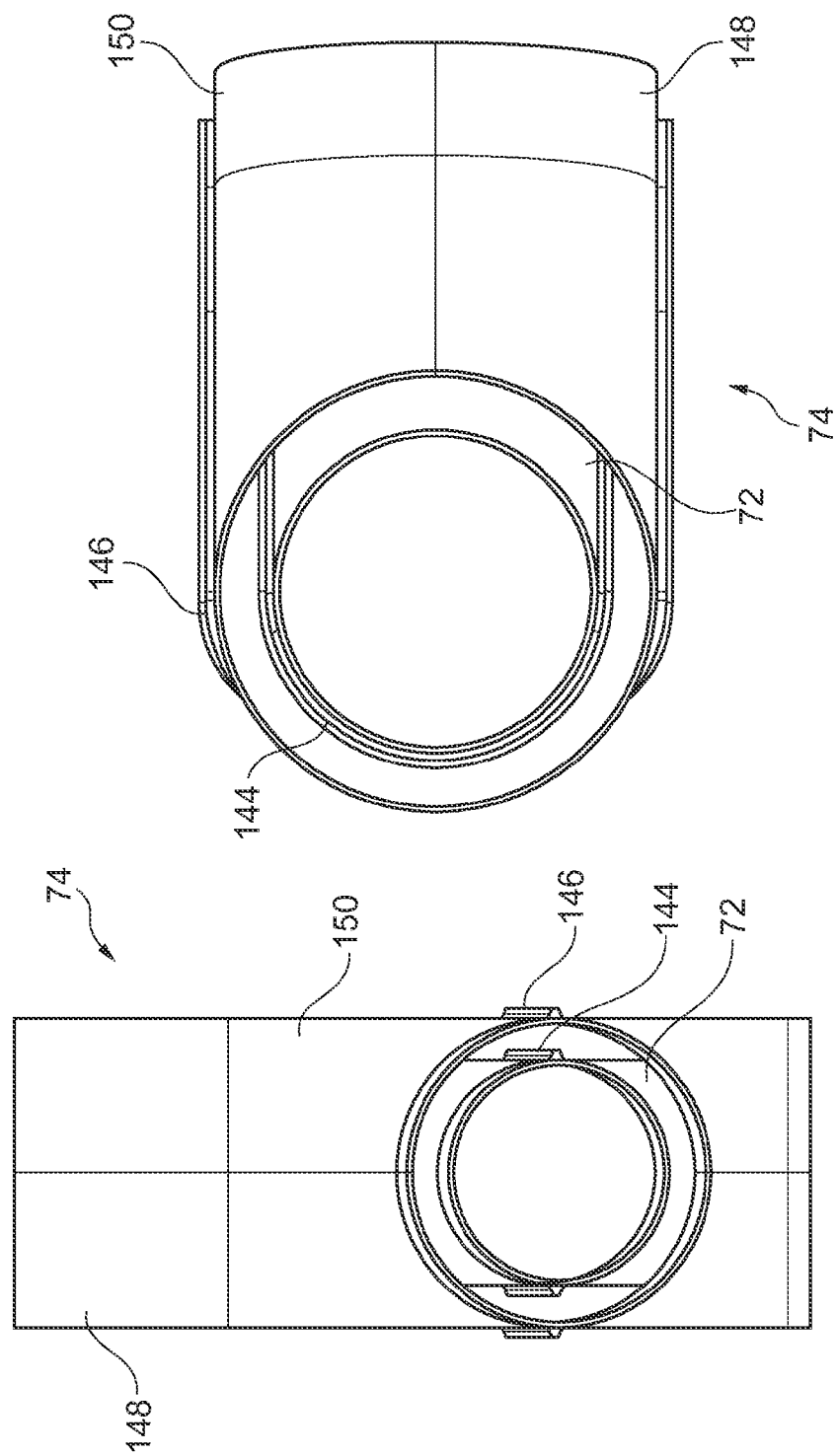

FUEL LINE IN AN AIRCRAFT

CROSS-REFERENCE TO RELATED APPLICATIONS

Figure 1:
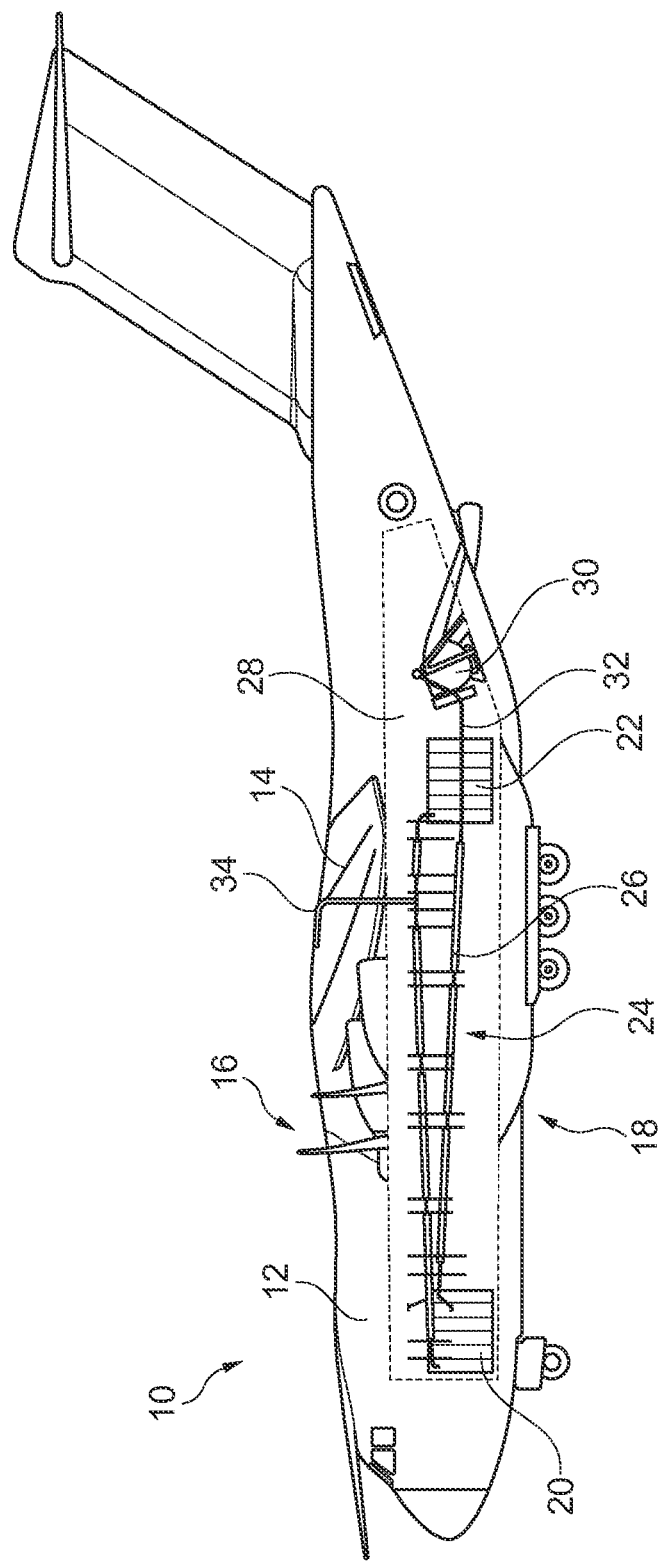

The present application claims priority under 35 U.S.C. §119 to German Patent Application No. 10 2101 050 000.3-22, filed on Nov. 2, 2011, the entire disclosure of which is expressly incorporated by reference.

BACKGROUND AND SUMMARY OF THE INVENTION

The present invention relates to a line segment of a fuel line in an aircraft for connecting at least three lines, an aircraft with a line for connecting refueling cells, the use of a line segment in an aircraft, and a method for producing a line segment.

Fuel lines are used in aircraft for connecting fuel tanks with appliances, as well as, for example, also for connecting several fuel tanks with each other. EP 1217286 A2 discloses a line that has been installed double walled. Additional fuel tanks are used, for example, in refueling aircraft by means of which, for example, other aircraft can be refueled in midair. It has become evident that the adapter lines and connector lines are becoming increasingly complex and must meet higher safety requirements. In addition to the simple line segments, this also applies to those line segments by means of which several lines are connected with each other, for example, for connecting a tank unit to a supply line.

For this reason there is a need to provide fuel channeling in an aircraft that has, for example, better properties with respect to damage or leakage.

This is achieved by a line segment of a fuel line in an aircraft for connecting at least three lines, by an aircraft, by the use of a line segment in an aircraft, as well as by a method for producing a line segment of a fuel line according to one of the independent claims.

According to an exemplary embodiment of the invention, a line segment of a fuel line in an aircraft for connecting at least three lines has a wall structure which forms a continuous cavity. The wall structure has at least three adapter openings for connecting the continuous cavity with respectively one line. The wall structure has a double walled design between the adapter openings in such a way that an intermediate cavity is formed, that encases the continuous cavity.

According to a further aspect of the invention, the adapter openings point in various directions.

According to a further aspect of the invention, the wall structure is provided with an inner wall and an outer wall.

According to a further aspect of the invention, the continuous cavity has a round cross-section at the adapter openings, whereby the cavity is designed in such a way that the adapter openings are connected with each other by chamfered inner wall sections.

For example, the chamfered walls are configured for a fuel flow of at least approximately 1,200 kg/min, in particular at least 1,800 kg/min. Preferably, the line segment according to the invention is configured for such a flow rate in both directions in order to allow a quick filling of the tanks and also a quick supply of fuel to other systems, for example, when refueling other aircraft in midair.

Thereby, the high internal pressures must be taken into consideration at different ambient pressures, i.e., the walls must be designed correspondingly robust, but must simultaneously be as light as possible.

According to a further aspect of the invention, the inner wall forms the continuous cavity, i.e., the inner wall surrounds the continuous cavity except for those sections that have the openings.

According to a further aspect of the invention, the outer wall is located at a distance to the inner wall and encloses the inner wall completely, i.e., except for those sections that have the openings.

According to a further aspect of the invention, the inner and the outer wall are at a uniform distance from each other.

According to a further aspect of the invention, the inner and the outer wall are located concentrically to each other, i.e., in those sections that have a round cross-section.

According to a further aspect of the invention, the inner wall is produced integrally.

According to a further exemplary embodiment of the invention, the wall structure has an inner wall and an outer wall, whereby at least the outer wall consists of two half-shells.

According to a further aspect of the invention, the inner wall and the outer wall are respectively provided as cast work piece.

According to a further aspect of the invention, the outer and/or inner wall is a press-forged work piece or a deep-drawn work piece.

According to a further aspect of the invention, at the adapter openings, one adapter flange is formed respectively, whereby the inner wall and the outer wall are connected with each other via the adapter flanges.

According to one exemplary embodiment of the invention, one adapter flange is respectively formed at the adapter openings, whereby the inner wall and the outer wall are connected with each other via the adapter flange. The adapter flanges have two connector bars that are formed on the diametrically opposed side of the connection faces and which stick out in the direction of the walls that are to be connected. The inner wall and the outer wall are connected with the facing sides of the connector bars.

According to a further aspect of the invention, the connector bars extend concentric, whereby an inner and an outer bar are formed. The inner wall is connected with the inner bar and the outer wall with the outer bar.

According to an exemplary embodiment of the invention, the line segment is a T-piece that has a T-bar and a T-flange, whereby a first connection is provided at the end of the T-bar, and whereby a second and third connection is provided at the two ends of the T flange.

According to a further aspect of the invention, the outer wall consists of two half-shells, whereby the two half-shells extend in a mirror image to a plane in the T-piece, which extends in the axis of the T-bar, and which is located transverse to the direction of the T-flange.

According to a further aspect of the invention, the two half-shells are mirror images to a plane that extends in the axis of the T-bar and in the axis of the T-flange.

According to a further aspect of the invention, the two half-shells consist of a sectional plane that extends through the axis of the T-flange and in a plane that is perpendicular to the T-bar.

According to a further aspect of the invention, the inner wall has a first reinforcement structure at the side facing away from the continuous cavity.

According to a further aspect of the invention, the outer wall has a second reinforcement structure.

According to a further aspect of the invention, the outer wall has the second reinforcement structure at the side facing away from the intermediate cavity.

According to a further aspect of the invention, the reinforcement structure on the T-piece is provided at the lateral sections of the T-bar.

According to a further aspect of the invention, the reinforcement structure encloses the inner wall of both lateral sections of the T-bar, starting from the T-flange.

According to a further aspect of the invention, a rib structure is provided between the inner wall and the outer wall, which has at least one rib.

According to one exemplary embodiment of the invention, a rib structure is provided between the inner wall and the outer wall, which has at least one rib, whereby the at least one rib is designed integral with the inner wall, and whereby the two half-shells of the outer wall are fastened at the rib.

According to a further aspect of the invention, the T-piece has a rib at the lateral sections of the T-flange.

According to a further aspect of the invention, a rib is provided on the T-piece at the T-flange at the side that is diametrically opposed to the T-bar, i.e., at that side which has no branching, i.e., at that side that is opposite to the branching of the T-bar.

According to a further aspect of the invention, the rib on the T-piece is provided at the lateral branches of the T-bar, whereby the rib starting at the first opening encloses the T-flange.

According to a further aspect of the invention, several ribs are provided in combination according to the preceding examples.

According to a further aspect of the invention, at least one rib is provided which is located inclined relative to the T-bar, T-flange and their virtual axes.

According to a further aspect of the invention, the rib—with its inner wall—forms an H-shaped profile in cross-section with two H-flanges that are connected by an H-bar, whereby the inner wall forms one of the H-flanges.

According to a further aspect of the invention, the outer wall is fastened at the other one of the two H-flanges.

According to a further aspect of the invention, the outer wall is fastened respectively at the facing sides of the other H-flange.

According to a further aspect of the invention, the walls consist of metal and are welded at the facing sides.

According to a further aspect of the invention, the individual components, for example, the walls and/or the adapter flanges are made of one work material because of expansion. For example, the component parts for the line segment are assembled by laser sintering, for example, by rapid prototyping, rapid tooling, rapid manufacturing, etc.

According to a further aspect, the parts are produced by laser welding.

According to a further aspect of the invention, the individual components, for example, the walls and/or the adapter flanges are assembled using a laser by adding titanium wire (i.e., rapid prototyping).

According to a further aspect of the invention, the rib structure divides the intermediate cavity into at least two intermediate spatial sections, whereby the at least one rib has at least one rib opening, through which two adjacent intermediate spatial sections are connected with each other.

According to a further aspect of the invention, at least one of the adapter flanges has at least one flange opening that forms an opening of the intermediate cavity on the facing side.

According to a further aspect of the invention, in a T-piece, the adapter flanges that are located diametrically opposed, i.e., the adapter flanges provided at the ends of the T-flange, respectively have at least one flange opening. For example, several flange openings are provided.

According to a further aspect of the invention, the intermediate spatial sections of the intermediate cavity are connected with each other via a number of openings in the rib structure in this way and are accessible via the flange openings respectively provided at the adapter flanges, so that fuel leaking into the intermediate space can be captured at a suitable location in the event of leakage. For example, a leakage drain (leak monitor) can be provided in a lower section of a fuel line to control and detect leakage amounts.

According to a further aspect of the invention, in a T-piece at the lateral sections of the T-bar, mounting positions are provided for connecting to structures that are exposed to loads.

The invention also relates to an aircraft with a fuselage design, an aerodynamic lift system, a propelling system and a fuel storage system, whereby the fuel storage system has at least two refueling cells that are connected with a fuel line. The line has a line segment according to one of the previously cited exemplary embodiments and aspects of the invention.

The propulsion system can, for example, include one or more jet engines or propeller drive units. The aerodynamic lift system includes, for example, two wings sticking out laterally from the fuselage design. The term aerodynamic lift system includes, for example, also pitch elevators in the section of the main deck, as well as in the posterior section of the aircraft, and one or more fins. According to one aspect of the invention, in addition to the fuel tank systems required for the actual flight operation, additional refueling cells are also present with which the range of the aircraft can be increased, or by means of which refueling of other aircraft is possible in midair.

For example, in a fuselage design that is, for example, also suitable for transport purposes, several refueling cells can be located in the cargo hold, for example, also in the anterior and in the posterior section, whereby a fuel line system can be present through which the two refueling cells can be connected.

The invention also relates to the use of a line segment according to one of the previously cited exemplary embodiments, as well as aspects in an aircraft.

The invention further also relates to a method for the production of a line segment of a fuel line in an aircraft for connecting at least three lines with at least three adapters, whereby the method includes the following steps:

a) Locating a first half-shell of an outer wall at an integral inner wall in such a way that an intermediate cavity is formed between the inner and the outer wall. The inner wall forms a wall structure that encloses a continuous cavity. The wall structure has at least three adapter openings for connecting the continuous cavity with respectively one line;

b) locating a second half-shell of an outer wall at the inner wall in such a way that an intermediate cavity is formed between the inner and the outer wall, whereby the intermediate cavity encases the continuous cavity.

c) connecting the first half-shell of the outer wall with the second half-shell of the outer wall; and d) connecting the outer wall with the adapter flanges, of which one is provided at each adapter opening, whereby the connection is done in such a way, that the outer wall is connected with the inner wall via the adapter flange.

According to one exemplary embodiment, prior to step d), an adapter flange is located at each adapter opening and in step d), the adapter flanges are also connected with the inner wall.

According to a further aspect of the invention, the inner wall is made available integral with the adapter flanges.

According to a further aspect of the invention, the connections are executed at least in part as butt joints.

According to a further aspect of the invention, the sections for the butt joints are designed more robust and prior to being placed, the sections are adapted to each other by machining.

According to a further aspect of the invention, at the positions that are to be connected, at least some positioning devices are provided.

According to a further aspect or the invention, the butt joints are provided as welded connections and the positioning devices are provided as additional edges of welded material, whereby the additional material is used in the connection steps for welding.

According to a further aspect of the invention, a reinforcement rib is provided at one inner wall and in step c), the first and the second half-shell are connected with each other via the reinforcement rib.

According to a further exemplary embodiment of the invention, the first and the second half-shell are produced with an integral wall. The integral wall is separated into two half-shells by using a cutting process along a joint. At the inner wall, a reinforcement rib is provided, whereby the reinforcement rib and the joint are adapted to each other with respect to their dimensions. The connection takes place in step c) in the section of the joint, whereby the first and the second half-shell are connected with each other via the reinforcement rib.

According to a further aspect of the invention, the adapter flanges are machine-finished on their connection face according to step d).

It should be noted that the characteristics of the exemplary embodiments and aspects of a line segment, as well as the aircraft, also apply to the embodiment forms of the method, as well as the use of the fuel line system and vice versa.

BRIEF DESCRIPTION OF THE DRAWING FIGURES

Figure 2:
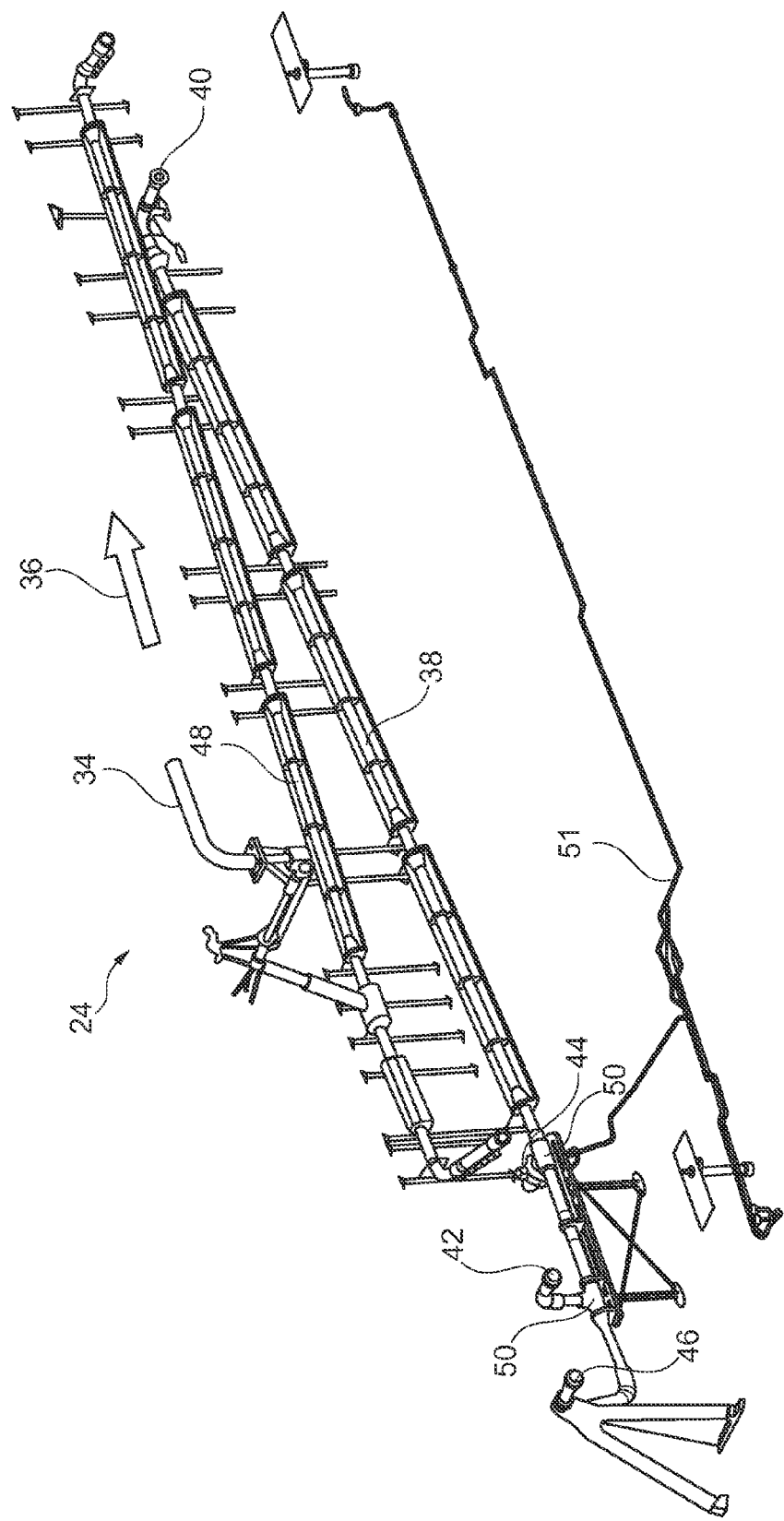
Figure 7:
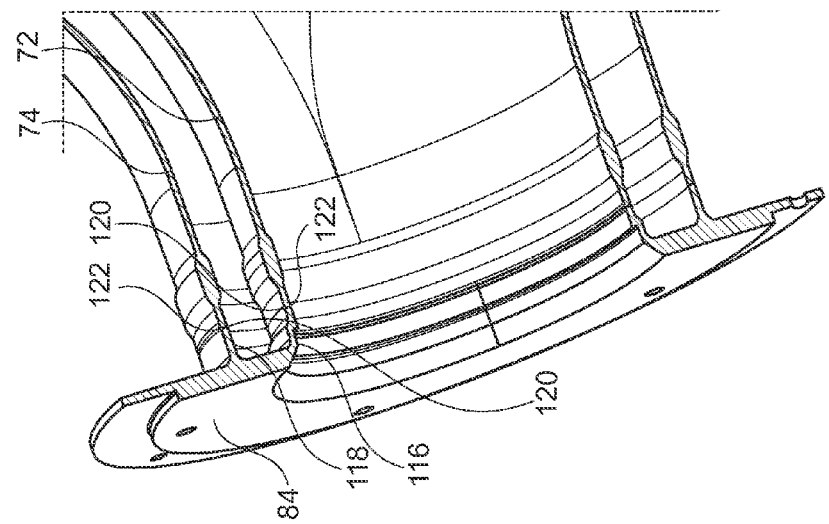
Figure 6:
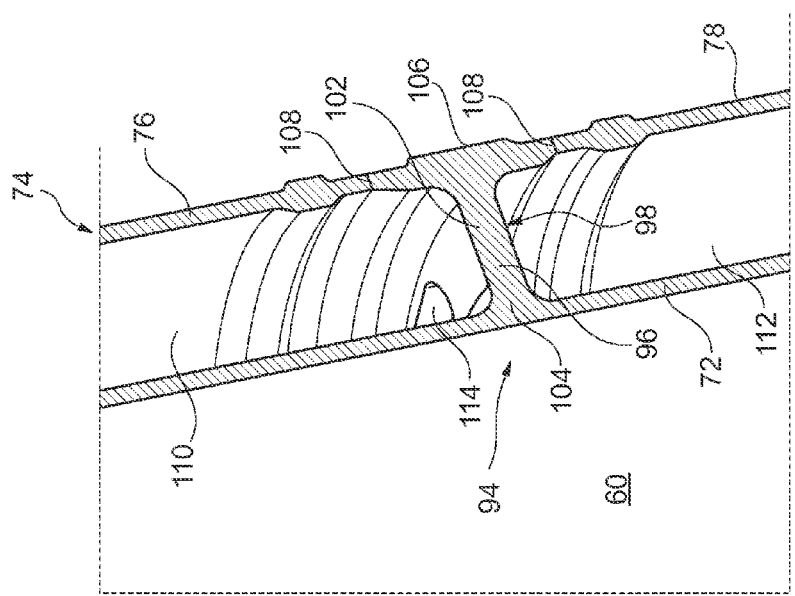
Figure 8:
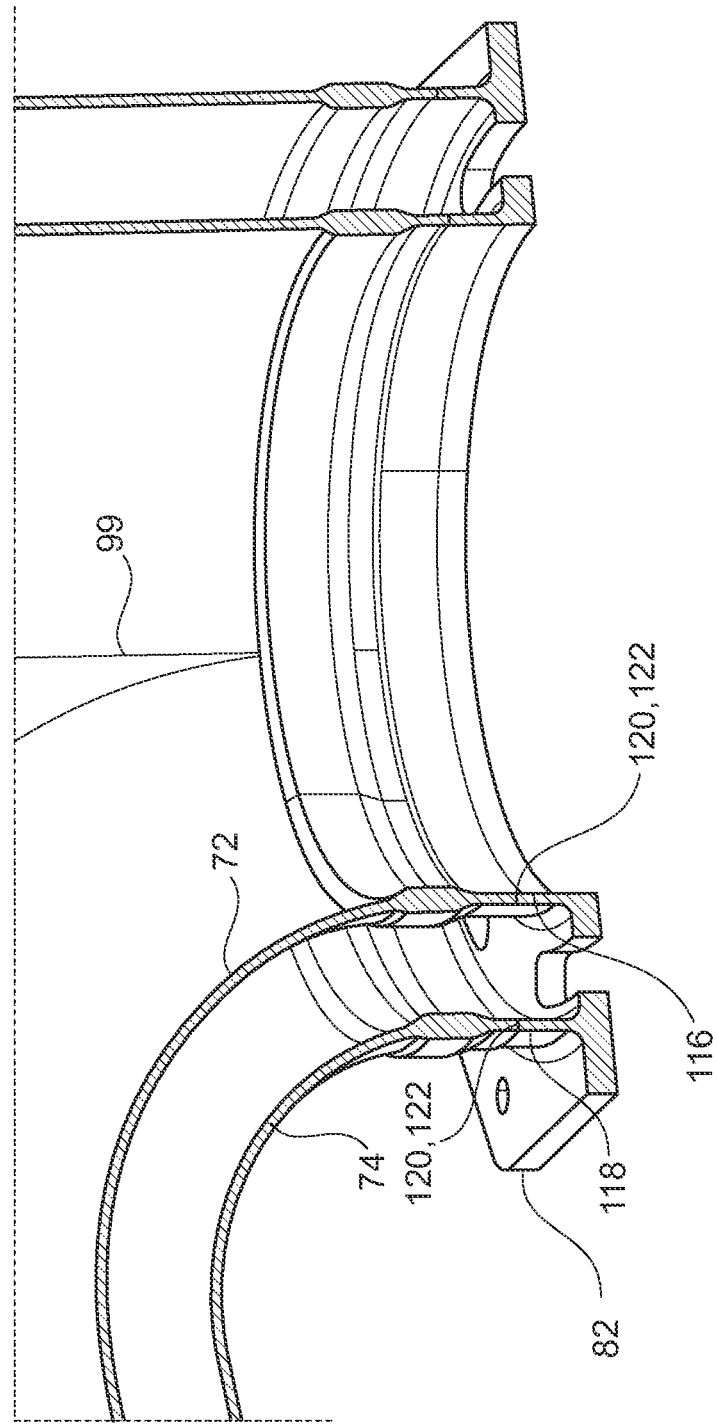
Figure 9:
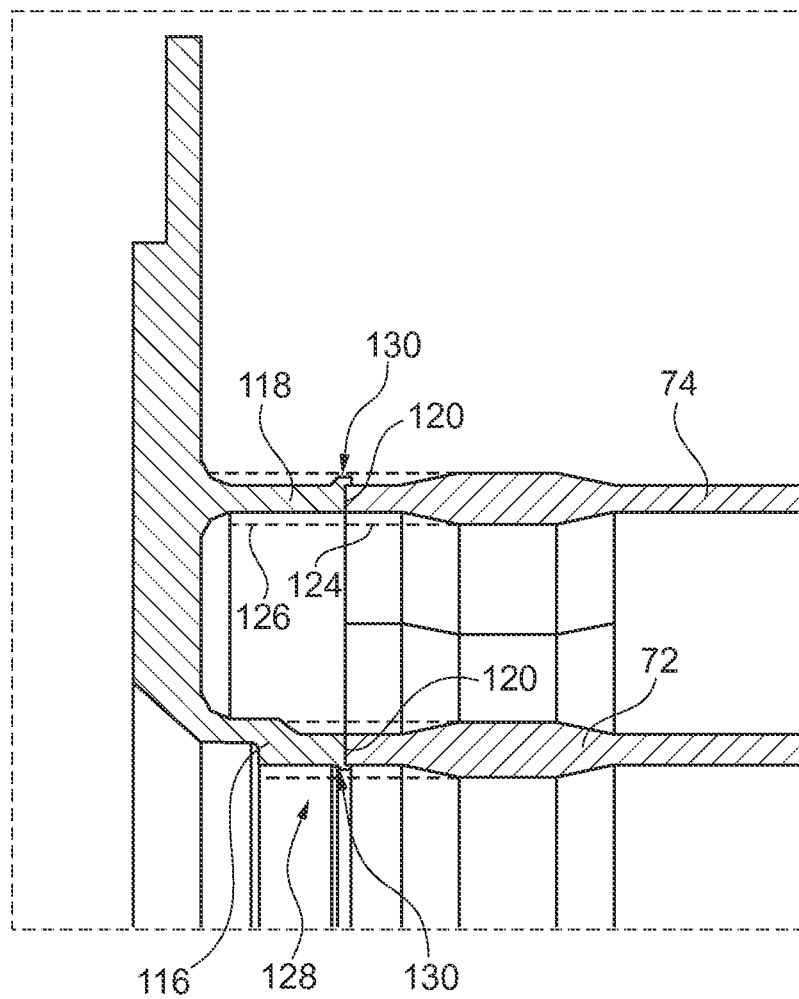
Figure 10:
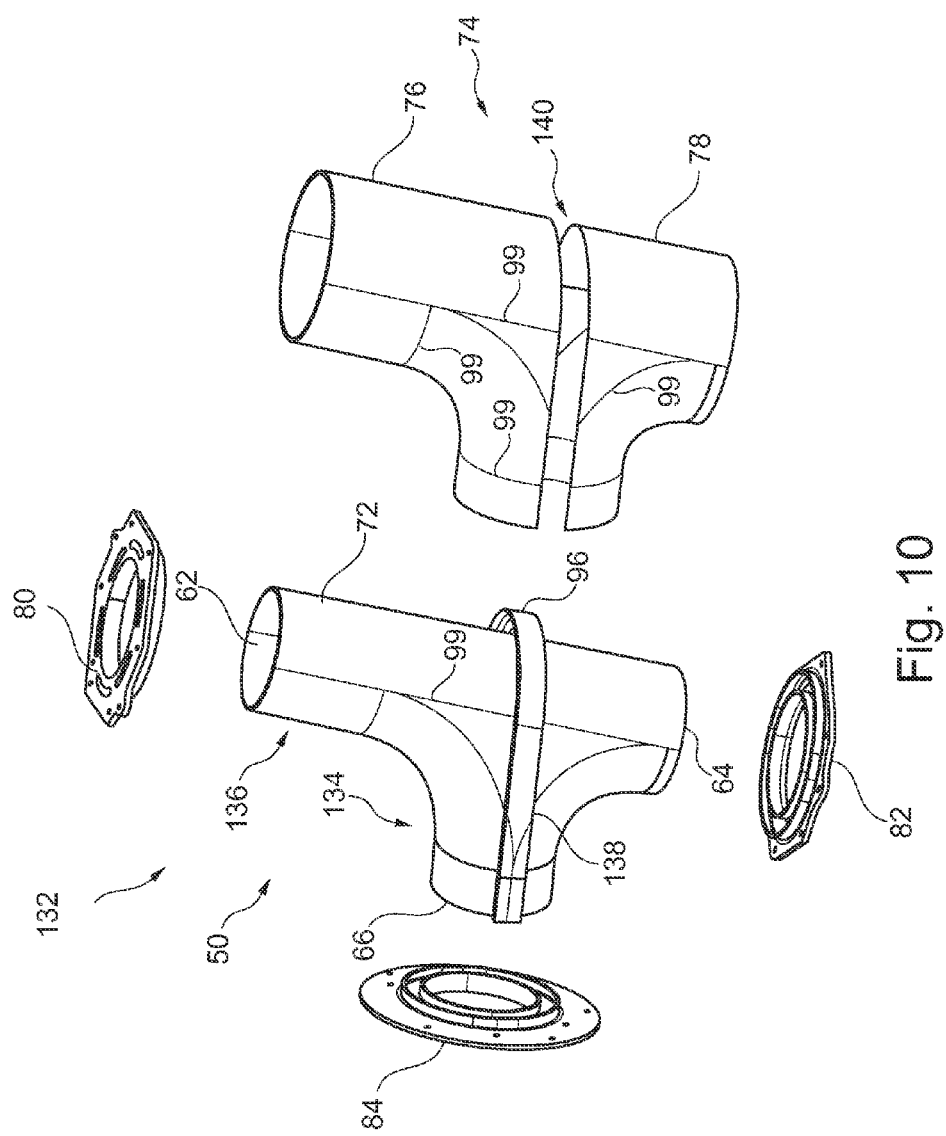
Figure 11:
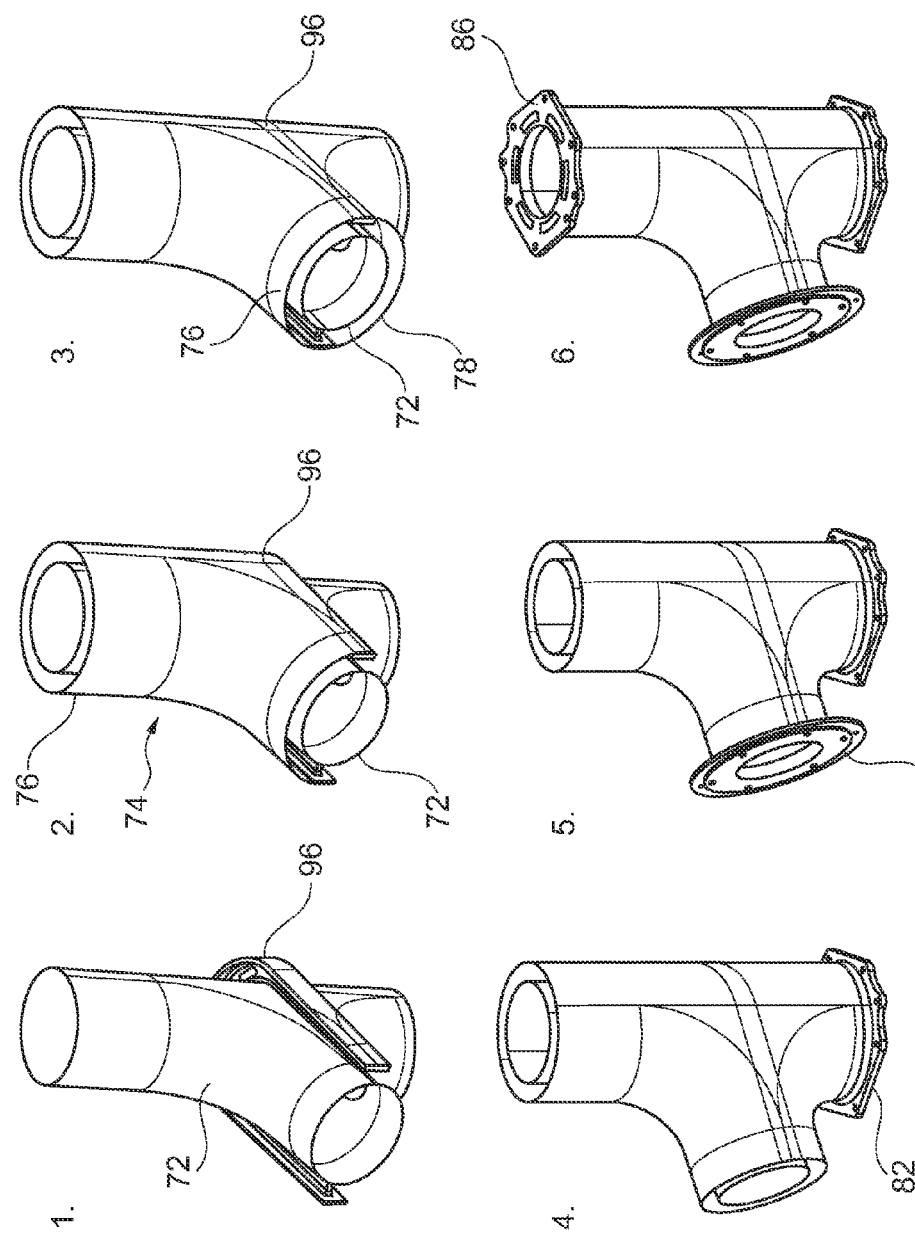
Figure 12:
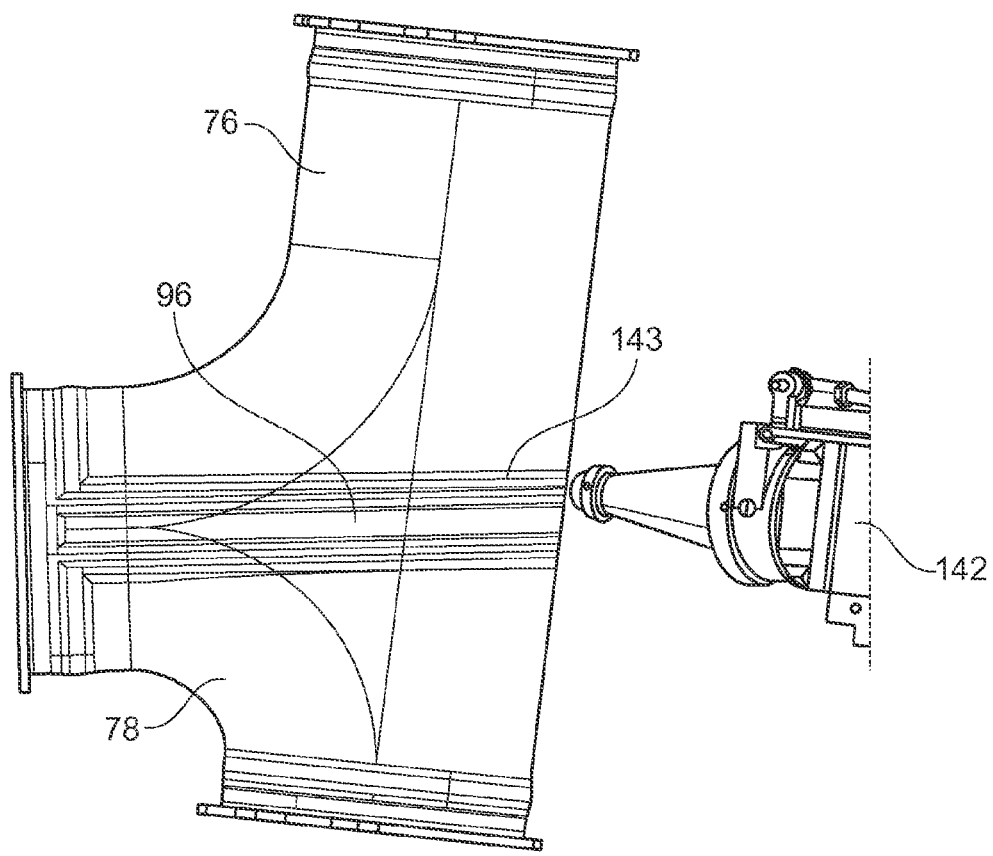
Figure 14:
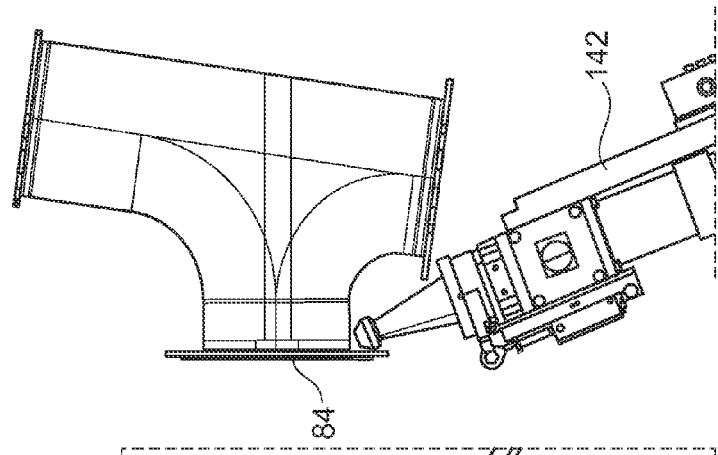
Figure 13:
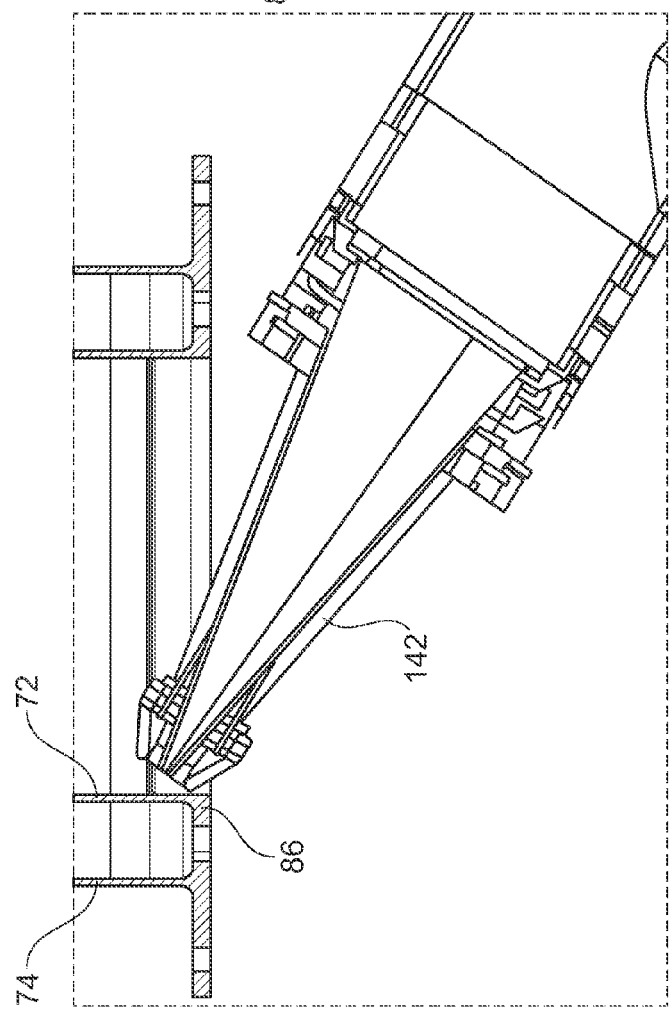
Figure 16:
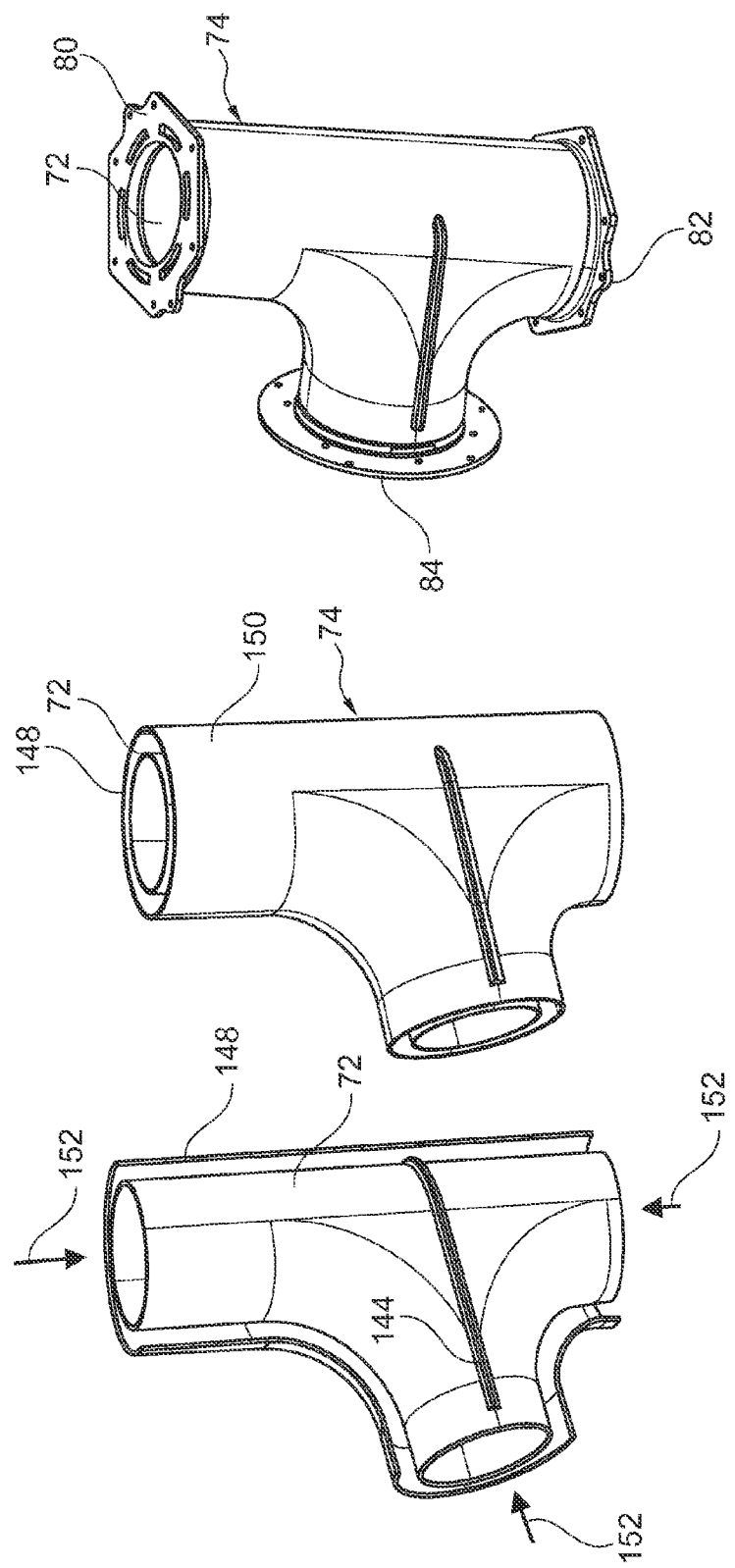
Figure 19:
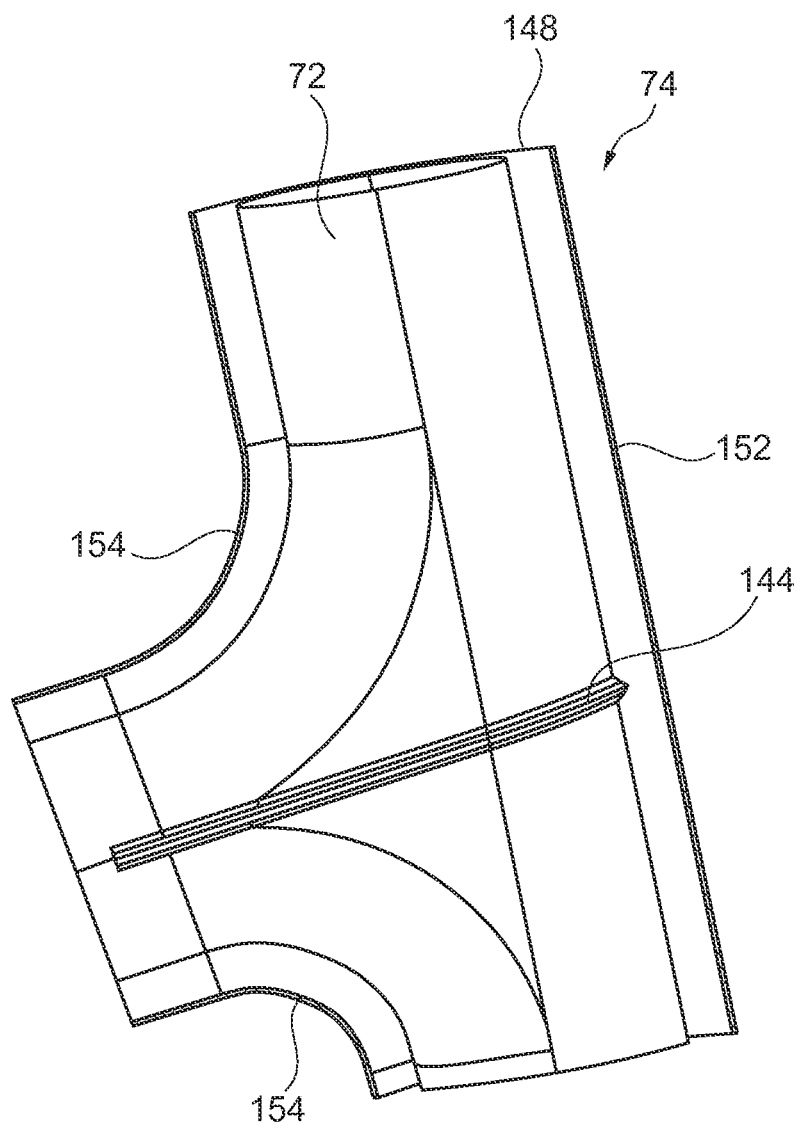
Figure 21:
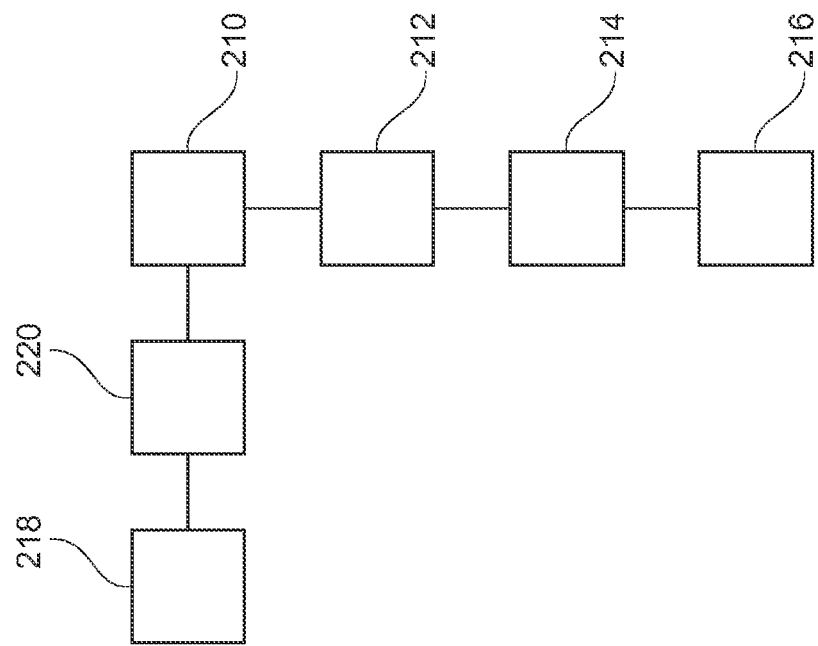
Figure 20:
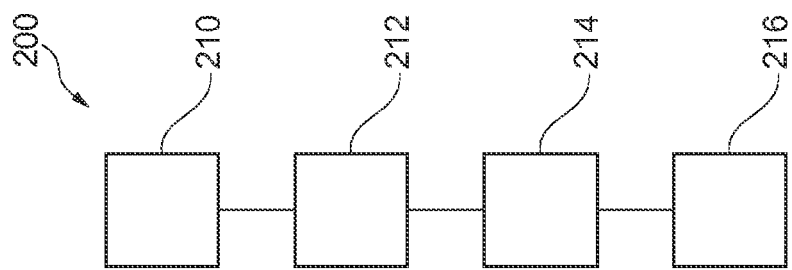

In the following, an exemplary embodiment of the invention will be described in more detail with the aid of the attached drawings. Shown are:

FIG. 1 an exemplary embodiment of an aircraft with a fuel line system with a line segment according to the invention;

FIG. 2 a fuel line system with line segments according to the invention in a first perspective view;

FIG. 3 a cut-out of a fuel line with a line segment according to the invention;

FIG. 4 a perspective view of a line segment according to the invention;

FIG. 5 a longitudinal cut through the line segment according to FIG. 4;

FIG. 6 a detail of the line segment from FIG. 5;

FIG. 7 a further detail of the line segment from FIG. 5;

FIG. 8 a further detail of the line segment from FIG. 5;

FIG. 9 a further detail of the line segment from FIG. 5;

FIG. 10 a schematic illustration of a component used for the production of a line segment according to the invention;

FIG. 11 a schematic illustration of work steps for the production process according to an exemplary embodiment;

FIG. 12 a further detail in the production process according to FIG. 10;

FIG. 13 a further detail in the production process of a line segment;

FIG. 14 a further detail in the production process of a line segment according to the invention;

FIG. 15 a further exemplary embodiment of a line segment during an exemplary production process;

FIG. 16 a further exemplary embodiment of a line segment and its schematic production steps;

FIG. 17 a cut-out of the exemplary embodiment of a line segment shown in FIG. 15;

FIG. 18 a further view of the line segment from FIG. 16;

FIG. 19 a schematic cross-section through a cut-out of the line segment from FIGS. 16 and 17;

FIG. 20 schematic steps of a method for the production process of a line segment according to the invention;

FIG. 21 schematic steps of a further exemplary embodiment of a method for the production process according to the invention.

DETAILED DESCRIPTION

FIG. 1 shows a schematic lateral view of an aircraft 10. Aircraft 10, for example, a transport aircraft, has a fuselage design 12, an aerodynamic lift system 14, a propulsion system 16 and a fuel supply system 18, for example, two refueling cells 20, 22 that are connected with a line system 24, or a line 26 of line system 24. Line 26 has at least one line segment 50 (FIG. 2) according to the invention, which will be described in more detail in the following.

The illustrated aircraft 10 is, for example, a transport plane, which is indicated by a schematically illustrated cargo hold 28. The illustration that has been selected is a combination of a view and a cross-section in the interest of providing a better understanding. In the interior of cargo hold 28, the illustrated version of the transport plane has the two refueling cells 20, 22 and a refueling system 30, with which, for example, other aircraft can be refueled while in midair. In order to be able to supply fuel to other aircraft, for example, combat aircraft, the two refueling cells 20, 22 are connected with each other by line system 24, in order to be able to pump fuel to and from the two refueling cells. Moreover, a connection 32 is indicated to be able to supply the fuel to refueling system 30. Further, a ventilation line 34 is indicated, by the use of which line system 24 can be ventilated overboard, for example, for pressure equalization and while draining or filling the fuel tank or the refueling cells.

According to a further aspect of the invention, the additional refueling cells 20, 22 can also be connected with the fuel tanks on board that are not shown further, in order to, for example, extend the range of aircraft 10.

In FIG. 2, line system 24 that has already been indicated in FIG. 1 is shown in a perspective illustration. For better understanding, the illustration of the two refueling cells 20, 22 are omitted. Moreover, it should be noted that the perspective illustration in FIG. 2 is presented in a different viewing direction of the aircraft according to FIG. 1, which is indicated by an arrow 36, which shows the flight direction.

For connecting the refueling cells that are not shown, which are located in FIG. 2 at the right upper end and the left lower end of the line system 24, a connection line 38 is provided, which is connected to the refueling cells by connectors 40, 42, 44. Further, a connector 46 for connecting with the fuel supply system or refueling system 30 is indicated. Additionally, the already cited ventilation line 34 is shown, which is connected with the two refueling cells 20, 22 via a ventilation distribution line 48.

Fuel transport line 38 represents a fuel line 26 of the system and has, for example, in the section of adapters 42 and 44, respectively one line segment 50 according to the invention, which will be described in more detail in the following.

Moreover, it should also be noted that FIG. 2 additionally has a water drainage line system 51, which shall, however, not be described in further detail.

In FIG. 3, a cut-out is shown of a fuel line 26, for example, in the section underneath adapters 42, 44, into which the fuel line segment 50 according to the invention is inserted in a line in such a way that it is used for connecting at least three lines. As can be seen from FIG. 3, line segment 50 is connected with a first line 52 that is connected in the upper section, a second line 54 that is connected in the lower section, and a third line 56 that is connected in the right section, whereby the third line is only indicated schematically.

According to one aspect of the invention, line segment 50 has a wall structure 58 that will be illustrated in more detail in connection with the following figures.

As shown in FIG. 4 and FIG. 5 in a schematic perspective view or a perspective cross-section view, wall structure 58 forms a continuous cavity. Moreover, wall structure 58 has at least three adapter openings, for example, an upper adapter opening 62, a lower adapter opening 64, as well as a lateral adapter opening 66. The three adapter openings 62, 64, 66 are for connecting the continuous cavity 58 with respectively one tube line, for example, the three lines 52, 54, 56 that have been described in connection with FIG. 3.

As can easily be seen in FIG. 5, wall structure 58 is designed double walled between adapter openings 62, 64, 66 in such a way that an intermediate cavity 68 is formed, which encases the continuous cavity.

As can be seen in the Figures, the adapter openings point in different directions.

In FIG. 5 it can also be seen that the continuous cavity 60 has a round cross-section at the adapter openings 62, 64, 66, and is designed in the interior in such a way that the adapter openings 62, 64, 66 are connected with each other by rounded inner wall sections of which—for reasons of simplicity—only one wall is identified with reference number 70.

Wall structure 58 has an inner wall 72 and an outer wall 74. The outer wall is located at a distance to the inner wall and completely encloses the inner wall. For example, the inner and the outer wall are located at a uniform distance from each other.

According to one aspect of the invention, inner wall 72 has an integral structure and outer wall 74 consists of two half-shells 76, 78, which will be explained in the following also in the context of the method for the production process.

Moreover, it should be noted that in the figures, thinner lines 99 are drawn into the cambered surfaces, which only indicate the exemplary contour and which are largely due to the drawing technique. These lines 99 do not represent partitions or even joints and are only for the purpose of illustration. For example, outer wall 74 and inner wall 72 are made of a casting material, for example, a titanium casting work piece. According to an exemplary embodiment that is not shown, the outer and the inner wall are provided as deep-drawn work piece.

Before the design of the integral inner wall and the outer wall that consists of two half-shells will be addressed, first, a short illustration of the sections of the adapter openings 62, 64, 66.

As shown in FIGS. 4 and 5, at the adapter openings, an adapter flange is formed respectively, for example, in FIG. 4, an upper adapter flange 80, a lower adapter flange 82, and a lateral adapter flange 84.

As can be seen in cross-section in FIG. 5, the inner wall 72 and the outer wall 74 are connected with each other by adapter flanges 80, 82, 84 (from FIG. 4).

According to one aspect of the invention, at least one of the adapter flanges has a flange opening. For example, the upper adapter flange 80 and the lower adapter flange 82 respectively have a number of longitudinal openings 86 that form openings on the facing side of intermediate cavity 68. As a result, it is possible, for example, to capture fuel discharging in the area between the inner and the outer wall, i.e., capture a leakage, as the fuel can be conveyed away from this section. For example, in FIG. 3, a connection 88 is shown in the lower section of a fuel line arc 90 that is connected to the fuel line segment according to the invention, which is, for example, a nipple by means of which drainage of leakages are made possible.

Likewise with respect to FIG. 3, in the lateral sections of the line segment, one or more mounting points 92 for connecting load-bearing structures can be provided, for example, to ensure better stability of the line system, in particular in the case of longer fuel line sections.

According to a further aspect of the invention, between the inner wall 72 and the outer wall 74, a rib structure 94 is provided which has at least one rib 96. As shown in FIG. 6 in the cut-out, the at least one rib 96 is formed integral with the inner wall 72.

As already mentioned above, the outer wall 74 consists of two half-shells 76, 78, for example, of one—relative to the illustration in FIG. 4—upper and lower half-shell, which is indicated by reference number 76 and 78. FIG. 6 shows that the two half-shells, i.e., the upper half-shell 76 and the lower half-shell 78 of outer wall 74, are mounted at rib 96.

For example, rib 96 is designed as surrounding rib with an H-profile cross-section 98. As shown in FIG. 6, rib 96 together with inner wall 72 forms the H-shaped profile in cross-section together with two H-flanges that are connected by an H-bar 102, i.e., an H-flange 104 located toward cavity 60 and an H-flange 106 located toward the outside. Thereby, the inner wall forms inner H-flange 104.

The outer wall is mounted at the other of the two H-flanges, i.e., the outer H-flange. For this purpose it is, for example, provided, that the two half-shells, i.e., the upper half-shell 76 and the lower half-shell 78, are mounted respectively at the facing sides 108 of the outer H-flange. For example, the walls as well as the rib profile are made of metal and the walls are welded at the facing sides, for example, with an I-weld-seam.

As likewise shown in FIG. 6, rib structure 94 divides intermediate cavity 68 into at least two intermediate spatial sections, i.e., an upper intermediate spatial section 110, and a lower intermediate spatial section 112. The at least one rib 96 thereby has at least one rib opening 114 with which the two bordering intermediate spatial sections 110, 112 are connected with each other. This rib opening 114 ensures the leakage detection function that has already been broached, which extends beyond line segment 50.

As shown in FIG. 7, and as already mentioned above, inner wall 72 and outer wall 74 are connected with each other by the adapter flange, for example, by a lateral adapter flange 84 as shown in a perspective illustration in FIG. 7.

It should be noted that the terms "lateral" or "upper" and "lower" relate to the position in the description in the figure and are only for the purpose of differentiation of the individual elements, for example, the adapter flange. The terms "lateral", "on top", "above", "on the bottom" or "underneath" are therefore not at all descriptions of positions for the actual installation site, or even possible installation limitations when used in an aircraft. In other words, the fuel line segment according to the invention is suitable for different installation positions and directions of connections.

The adapter flanges respectively have two connector bars. For example, lateral adapter flange 84 in FIG. 7 has an inner adapter bar 116 and an outer connector bar 118, which extent, for example, concentrically. Connector bars 116, 118 are formed on the diametrically opposite side of the connection faces of the adapter flanges and stick out in the direction of the walls that are to be connected, i.e., in the direction of inner wall 72 and outer wall 74.

Inner wall 72 and outer wall 74 are connected by their facing sides 120 with facing sides 122 of the connector bars.

For example, the connections are established as welded connections. Thereby, the already addressed flange openings 86 in FIG. 5 in connection with rib opening 114 (FIG. 6) can also provide the required access to the cavity behind the weld seam for certain welding processes, for example, for a gas rinse.

In FIG. 8, lower adapter flange 82 is shown in a perspective cross sectional illustration according to FIG. 5. In contrast to lateral adapter flange 84, here, flange openings 86 can be seen easily.

Connector bars 116, 118 can also be seen in FIG. 8, by means of which outer wall 74 and/or inner wall 72 are mounted onto the adapter flange 82 by a weld connection at the previously cited facing sides 120, 122, and thus outer wall 74 is connected with inner wall 72 via the adapter flange and its connector bars.

In FIG. 9, the already cited lateral adapter flange 84 from FIG. 7 is shown in a cross-section view.

As indicated by dotted line 124, the edge sections of the inner wall 72, for example, and the outer wall 74, i.e., the sections in which facing sides 120 are formed, are first produced having a greater material thickness, for example, in a casting process.

As likewise indicated in a second dotted line 126, the connector bars, i.e., the inner connector bar 116 and the outer connector bar 118, are first produced having a greater material thickness in this section.

As it is often difficult to achieve the required levels of precision in the casting processes, the machining of the material takes place in such a way that the excess material is eliminated prior to connecting by corresponding machining, for example, by dressing to size. Thereby, the formation of the adapter sections, i.e., connector bars 116, 118, as well as facing sides 120 of outer and inner wall 72, 74 takes place with the required precision to each other.

The cross-section thickenings that are left standing also serve to stiffen the wall sections.

While machining the material and adapting the sections for the butt joint connection to each other, at the positions that are to be connected, at least some positioning systems 128 can be provided. For example, the positioning systems are also designed as additional edges of welding material 130, in order to make additional material available, which is needed for the welding processes to connect the outer and inner wall with the connector bars.

For example, the positioning systems can be located only partially distributed, for example, at three positions over the circumference, or also as continuous stop angles, which is useful especially then, when the positioning systems are also used as welding addition.

The connection of the upper and lower half-shell with the rib structure or the rib 96 (FIG. 6 and FIG. 12) takes place, for example, without an additional welding edge, such as is shown, for example, for the connection of the connector bars to the adapter flanges in FIG. 9.

According to one aspect of the invention, however, such a type of a weld edge can be provided at the connection of rib 96 to the half-shells of the outer walls.

Fuel line segment 50 can, for example, be a T-piece 132 (FIG. 10), as this was described in the preceding figures by way of example. T-piece 132 has a T-bar 134 and a T-flange 136. In the embodiment shown, the T-flange is formed between the upper opening 62 and the lower opening 64, whereas T-bar 134 is formed between lateral opening 66 and the connection line between upper and lower opening 62, 64.

In other words, a first connection i.e., the lateral connection is provided at the end of the T-bar and a second and a third connection, i.e., the upper and the lower connection are provided at the two ends of the T-flange.

According to a further aspect of the invention, which is, however, not shown in more detail, the line segment according to the invention is designed with a Y-shape, in which, for example, the three lines that are to be connected meet each other at evenly distributed angles.

According to a further aspect of the invention, likewise not shown, a first line is connected with two additional lines in a Y-shape, whereby the two additional lines are located at a substantially smaller angle to each other than the two lines respectively to the first line.

According to a further aspect of the invention, the lines are located in a plane, as it is, for example, shown in a T-piece according to FIG. 4 and those following.

According to a further aspect of the invention, the lines are located in different planes, i.e., two lines span one plane and the third, the line connected to the line segment according to the invention, lies in a different plane or spans over an additional plane with one of the two lines.

FIG. 10 schematically shows—in a type of explosion drawing—out of which individual elements line segment 50 according to the invention consists, as per an exemplary embodiment.

Inner wall 72 is shown in FIG. 10 with rib 96 that has already been mentioned, whereby rib 96 is provided at T-piece 132 at the lateral sections, identified with reference number 138, of T-bar 134, whereby the rib extends from the first opening, i.e., lateral opening 66.

FIG. 10 illustrates that rib 96 surrounds, for example, the section of T-flange 136, i.e., extends from the one (anterior) side to the other side, i.e., up to the posterior side (in relation to the illustration in FIG. 10).

According to a further exemplary embodiment—not shown—one rib is provided on the T-piece at the T-flange on the side that is diametrically opposed to the T-bar.

According to a further exemplary embodiment (not shown), the rib is provided at the T-piece on the lateral sections of the T-flange.

According to a further aspect of the invention, the outer wall 74 consists of the already cited two half-shells 76 and 78. For example, outer wall 74 is first produced with an integral wall and subsequently, by using a cutting process along a joint, as indicated by reference number 140 in FIG. 10, cut into two half-shells, namely into upper half-shell 76 relative to FIG. 10, and lower half-shell 78. Joint 140 is coordinated in its dimensions, i.e., in its width with reinforcement rib 96, so that upper half-shell 76 and lower half-shell 78 can be attached and connected with each other at the facing side sections of the connection of the flange of the H-profile of the rib, as has already been explained relative to FIG. 6.

According to a further aspect of the invention, outer wall 74 consists of two half-shells, whereby on the T-piece, the two half-shells are mirror images to a plane that extends in an axis of the T-piece and which is located horizontal to the direction of the T-flange.

This structural principle is modified in FIG. 10 to the effect that the upper half-shell 76 and the lower half-shell 78 have different connection lengths for the upper or the lower connection and also different connection angles—or deviating from a right angle—of the connection lines to each other.

According to a further aspect of the invention, the two half-shells are designed as mirror images to a plane that extends in the axis of the T-bar and in the axis of the T-flange (not shown in further detail).

According to a further aspect of the invention, the two half-shells are formed by a cutting plane that extends through the axis of the T-flange and extends in one plane perpendicular to the T-bar.

In FIG. 11, six different steps are shown schematically during the manufacture or production process of a line segment according to the invention.

It should be noted that the sequence of the individual drawings in FIG. 11 are to be read first in the upper row from left to right and then in the lower row from left to right.

In the first drawing, an inner wall 72 is provided with the already provided, i.e., integrally produced rib structure having rib 96. In a first step, in the second drawing, the upper half-shell 76 of the outer wall 74 is then placed over inner wall 72 in such a way, i.e., placed over it from the top that upper half-shell 76 abuts at the facing side connection edges of rib 96 and, for example, can be mounted at the rib by using a welding process. In a further step that is shown in the third drawing, the lower half-shell 78 is placed over first wall 72 from the bottom in such a way that the lower half shell 78 abuts at rib 96 or at its edges. Lower half-shell 78 can then likewise be welded with rib 96.

In the next, i.e., in the step shown in the fourth drawing, lower adapter flange 82 is then positioned and inner wall 72 and lower half-shell 78 of outer wall 74 are welded together with lower adapter flange 82 or with its connection bars.

In the next step, i.e., the step shown in the fifth drawing, the lateral adapter flange 84 is positioned and likewise welded with the inner and the outer wall.

In a further step shown in the sixth drawing, adapter flange 86 is connected with the outer and the inner wall, i.e., welded.

FIG. 12 schematically shows how, by using an automatically guided welding unit 142, the upper half-shell 76 or the lower half-shell 78 is welded onto rib 96 with revolving I-seams 143. For example, this can take place by adding an additional work material or by means of the already cited additional welding edges, which can also be used as a possibility for centering (see FIG. 9).

FIG. 13 and FIG. 14 schematically shown how, by using welding unit 142, inner wall 72 can be welded with the connection bar of an adapter flange, for example, lower adapter flange 86. In FIG. 14, this is shown for the connection of the outer wall with the outer connector bars of the adapter flanges by way of example for lateral adapter flange 84.

According to a further aspect of the invention, inner wall 72, on the side facing away from the continuous cavity 60, has a first reinforcement structure 144, which is shown schematically in FIG. 15.

For example, the outer wall can also have a reinforcement structure, i.e., a second reinforcement structure 146. FIG. 15 shows that outer wall 74 has second reinforcement structure 146 on the side facing away from the intermediate cavity, i.e., it is visible from the outside.

For example, the reinforcement structure of the T-piece is provided at the lateral sections of the T-bar, as shown in FIG. 15. The first reinforcement structure of inner wall 74 thereby emanates from the two lateral sections of the T-bar from the lateral adapter flange 84 and encloses the T-flange.

Moreover, in FIG. 15, a further aspect of the invention is shown. As indicated by the schematic explosion illustration, outer wall 74 is partitioned into a first half-shell 148 and a second half-shell 150 that are separated from each other by a cutting plane which extends through the axis of the T-flange and through the axis of the T-bar. In other words, the half-shell partition shown in FIG. 15 does not take place by a horizontal cut relative to the illustration in the figure, but by a vertical cut.

According to a further aspect of the invention, the two half-shells are produced individually, for example, cast, which reduces the costs for the casting tool and thus no outer T-piece would have to be cast and subsequently divided.

It should be noted at this point that the different aspects of the illustrations in the figures can certainly also be considered separate from each other and can, correspondingly, be combined. For example, rib structure 94 that is illustrated in FIG. 4 and the following, can also be placed vertically instead of horizontally and be combined with the shell design from FIG. 15.

As an additional example of the combinability of the different aspects it should be noted that the reinforcement structure shown in FIG. 15 can be combined on the outer side of the inner wall and also the reinforcement structure of the outer wall with the shell formation from FIG. 4 and the following.

These cited possibilities of combination are only mentioned by way of example and in no way exclusive.

According to a further aspect of the invention that can also be combined with the different aspects, it is shown in FIG. 15 that inner wall 72 is made available with flanges that are already molded on.

Thereby, the connection sections can be designed with or without additional welding material edges.

According to a further aspect of the invention that can also be applied to the different figures and the cited aspects that are not illustrated by figures consists therein, that the flange of the adapter flanges can be machined subsequently in order to make the precision that is required here available for the connection faces for connecting with the lines that are to be connected.

According to a further aspect of the invention, in the design of inner wall 72 having first reinforcement structure 144, the production process can take place in such a way that first inner wall 72 is centered using pins—indicated by three arrows 152—so that the one half-shell, for example, posterior half-shell 148 of outer wall 74 aligned to inner wall 72, can be positioned. This is shown in the left illustration in FIG. 16. In a further step, the second half-shell, for example, the anterior half-shell 150, is then aligned and positioned and connected with the posterior half-shell 148, for example, by means of a weld connection. Thereby, the connection sections can be formed with or without additional weld edges.

In a further step, which is shown in the left section of FIG. 16, the flanges are positioned and connected with the outer wall and the inner wall by a weld connection. Thus, only at this time, a connection takes place between inner wall 72 and outer wall 74, as the shown reinforcement structure 144 is not designed robust enough in order to establish contact between the two walls.

According to a further aspect of the invention that is, however, not shown in further detail, the reinforcement structure has at least in sections, a dimension that is formed in such a way that the positioning of the outer half-shells can take place by using these reinforcement protrusions.

In FIGS. 17 and 18, the formation of first reinforcement structure 144 is illustrated schematically, as well as the formation of the second reinforcement structure 146 in two different views.

Relative to the illustration in FIG. 16, FIG. 17 shows a lateral view from the direction of the lateral connection of the state that is shown in FIG. 16 in the center, i.e., at aligned inner and outer walls.

In FIG. 18, the state from FIG. 16 in the center is shown in a top view, i.e., in a direction with a view from above, i.e., from the upper opening. In both FIGS. 17 and 18, the adapter flanges are not shown.

In FIG. 19, the state from FIG. 16 in the left section is shown in a view. As illustrated, first reinforcement structure 144 surrounds the section of the T-flange. Because of the weld seams in the connection of the two outer half-shells, there is a reinforcement of the outer wall in these sections, which is indicated in FIG. 19 by reference number 152 for the perpendicular seam section, and by reference number 154 for the two other cambered seam sections, as in the section of the seams, local material thickening takes place, which is provided in order to be able to precisely coordinate the connection sections with each other in a machining process, as has already been explained in detail above.

According to a further aspect of the invention which is, however, not shown in more detail, the outer wall can also be designed with a revolving or encasing reinforcement structure which is, however, interrupted by seam connection 152, or which must be separately connected at this position.

Finally, in FIG. 20, a method according to the invention for the production of a line system of a fuel line in an aircraft for connecting at least two lines with at least three adapters is shown having the following steps: In a first configuration step 210, a first half-shell of an outer wall is located at an integral inner wall in such a way that between the inner and the outer wall, an intermediate cavity is formed, whereby the inner wall forms a wall structure that encloses a continuous cavity, and whereby the wall structure has at least three adapter openings for connecting the continuous cavity with respectively one line. In a second configuration 212, a second half-shell of an outer wall is located at the inner wall in such a way that an intermediate cavity is formed between the inner and the outer wall, whereby the intermediate cavity encases the continuous cavity.

In a first connection step 214, the first half-shell of the outer wall is connected with the second half-shell of the outer wall, and in a second connection step 216, the outer wall is subsequently connected with the adapter flanges, of which one is provided at each connection opening, whereby the connection is done in such a way that the outer wall is connected with the inner wall via the adapter flange.

According to a further aspect of the invention, the first configuration step 210 is also described as step a), the second configuration step as step b), the first connection step 214 as step c), second connection step 216 as step d).

According to a further aspect of the invention, prior to step d), i.e., prior to second connection step 216, an adapter flange is placed at each connection opening, and in step d) the adapter flanges are also connected with the inner wall.

As already explained above in a different context, according to a further aspect of the invention, in step a), i.e., in the first configuration step 210, the inner wall is made available integral with the adapter flanges, whereby the connections are executed at least in part as butt joints. Thereby, the sections for the butt joints are designed more robust and prior to the placement they are adapted to each other by machining, whereby at the positions that are to be connected, positioning units are provided at least sometimes. According to a further aspect of the invention, the butt joints are welded connections and the positioning systems are provided as additional edges of welding material. The additional material is used in connection steps 214, 216 for the welding process.

According to a further aspect of the invention, which is shown schematically in FIG. 21, the first and the second half-shell are produced with an integral wall in one production step 218, and subsequently separated by using a cutting procedure in a cutting step 220 along a joint into two half-shells. Thereby, at the inner wall a reinforcement rib is provided, for example, and the reinforcement rib and the joint are coordinated with each other in their dimensions, Subsequently, in step c) i.e., in first connection step 214, which is provided subsequent to first configuration step 210 and second configuration step 212, in the section of the joint and the first and the second half-shell are connected with each other by the reinforcement rib.

According to a further aspect of the invention, first a number of half-shells are produced, first by integral production and subsequently cut into two (or also several) half-shells or partial shells. Subsequently, the steps of joining and connection take place.

According to a further aspect of the invention, rib 96 (FIG. 11) is formed as an I-profile sticking out from the inner wall, i.e., a bar without a once again laterally branching flange, as this is the case in an H-profile. The connection or the adaptation of the two outer half-shell then takes place likewise by means of a weld seam, whereby the seams are not formed as continuous I-seams, but as hollow seams.

Titanium work material is provided as material, for example, by the use of which the illustrated shapes can be produced in a casting process.

According to a further aspect of the invention, aluminum or magnesium alloy can also be used as material, whereby thereby, of course, the connection processes, i.e., the welding processes are correspondingly coordinated with the material.

In addition, it is to be pointed out that "including" does not exclude any other elements or steps and "one" or "a" does not exclude several. Further, let it be pointed out that characteristics or steps that have been described with reference to one of the above exemplary embodiments, can also be used in combination with other characteristics or steps of other exemplary embodiments described above. The reference numbers in the claims are not to be viewed as limitation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A line segment of a fuel line in an aircraft for connecting at least three lines, comprising:
   a wall structure forming a continuous cavity, wherein the wall structure has at least three adapter openings configured to connect the continuous cavity with one line respectively, and wherein the wall structure consists of two half-shells, each half-shell defining a continuous, one-piece structure that includes an inner wall, an outer wall, and a rib that permanently fixes the inner wall to the outer wall, such that an intermediate cavity is formed between the inner wall and the outer wall, the inner wall defining the continuous cavity within which contents of the line segment flow through.

2. The line segment as recited in claim 1, wherein an adapter flange is respectively arranged at each of the at least three adapter openings, wherein the inner wall, the outer wall, and the adapter flange are integrally formed;

wherein the adapter flanges have two connector bars configured on a diametrically opposed side of connection faces and stick out in a direction of the walls that are to be connected; and wherein the inner wall and the outer wall are connected with their facing sides with the facing sides of the two connector bars.

3. The line segment as recited in claim 1, wherein the line segment is a T-piece having a T-bar and a T-flange, wherein an end of the T-bar has a first connection, and wherein two ends of the T-flange respectively have a second and third connection.

4. The line segment as recited in claim 1, wherein the two half-shells of the outer wall are mounted at the rib.

5. An aircraft, comprising:
- a fuselage;
- an aerodynamic lift system;
- a propulsion drive system; and
- a fuel tank system, wherein the fuel tank system has at least two refueling cells connected with a line, wherein the line has at least one line segment for connecting at least three lines, the line segment comprising a wall structure forming a continuous cavity, wherein the wall structure has at least three adapter openings configured to connect the continuous cavity with one line respectively, and wherein the wall structure consists of two half-shells, each half-shell defining a continuous, one-piece structure that includes an inner wall, an outer wall, and a rib that permanently fixes the inner wall to the outer wall, such that an intermediate cavity is formed between the inner wall and the outer wall, the inner wall defining the continuous cavity within which contents of the line segment flow through.

6. The method as recited in claim 5, wherein at least the outer wall consists of two half-shells, an adapter flange is respectively arranged at each of the at least three adapter openings, and the inner wall, the outer wall, and the adapter flange are integrally formed.

7. A method for the production of a line segment of a fuel line in an aircraft for connecting at least three lines with at least three adapters, the method comprising the steps:
- a) configuring a first half-shell of in such a way that an intermediate cavity is formed between a first inner and a first outer wall of the first half-shell to form a wall structure, wherein the inner wall defines a continuous cavity within which contents of the line segment flow through, and wherein the wall structure has at least three adapter openings for connecting the continuous cavity with respectively one line;
- b) configuring a second half-shell in such a way that an intermediate cavity is formed between a second inner and a second outer wall of the second half-shell, wherein the intermediate cavity surrounds the continuous cavity;
- c) connecting the first half-shell with the second half-shell; and
- d) connecting the first and second outer wall with adapter flanges, one of which is provided at each connection opening, wherein the connection is configured such that each of the first and second outer wall is respectively connected with the first and second inner wall via the connection flange, wherein the first half-shell is a continuous, one-piece structure that includes the first inner wall, the second wall, and a reinforcement rib that permanently fixes the first inner wall to the first outer wall.

8. The method as recited in claim 7, wherein prior to step d), an adapter flange is located at each adapter opening; and wherein in step d), the adapter flanges are also connected with the first and second inner wall.

9. The method as recited in claim 7, wherein the first and the second half-shell are produced with an integral wall and are cut into two half-shells by using a cutting process along a joint, wherein the reinforcement rib and the joint are coordinated with each other in terms of their dimensions, and wherein the connection in step c) takes place in the section of the joint and whereby the first and the second half-shell are connected with each other via the reinforcement ribs.

10. The method as recited in claim 7, wherein at least the first inner wall, the first outer wall, and the adapter flanges are integrally formed.

* * * * *